United States Patent
Anton et al.

(10) Patent No.: US 7,601,937 B2
(45) Date of Patent: Oct. 13, 2009

(54) PHOTON DETECTOR FOR PHOTON-INDUCED TRIGGERING OF MEASURING ELECTRONS

(75) Inventors: Gisela Anton, Erlangen (DE); Thilo Michel, Nürnberg (DE)

(73) Assignee: Friedrich-Alexander-Universität Erlangen-Nürnberg, Erlangen (DE)

( * ) Notice: Subject to any disclaimer, the term of this patent is extended or adjusted under 35 U.S.C. 154(b) by 68 days.

(21) Appl. No.: 11/767,831

(22) Filed: Jun. 25, 2007

(65) Prior Publication Data
US 2008/0033673 A1   Feb. 7, 2008

Related U.S. Application Data

(60) Provisional application No. 60/815,833, filed on Jun. 23, 2006.

(30) Foreign Application Priority Data
Jun. 24, 2006   (DE) .................. 10 2006 029 184

(51) Int. Cl.
*H01J 40/14*   (2006.01)
(52) U.S. Cl. .................. 250/207; 250/214 R; 313/528
(58) Field of Classification Search .......... 250/207, 250/214.1, 214 R, 214 VT; 313/527, 528, 313/539
See application file for complete search history.

(56) References Cited

U.S. PATENT DOCUMENTS 5,461,226 A * 10/1995 Nicoli et al. .......... 250/214 VT (Continued)

FOREIGN PATENT DOCUMENTS

DE   69829769 T2   3/2006

OTHER PUBLICATIONS

Mark W. Lenox et al. "Coincidence Time Alignment for Planar Pixellated Positron Emission Tomography Etector Arrays", 2001 IEEE Nuclear Science Symposium Conference Record, vol. 4, 2002 p. 1952-1954; (Particularly Section II).

(Continued)

*Primary Examiner*—Georgia Y Epps
*Assistant Examiner*—Francis M Legasse, Jr.
(74) *Attorney, Agent, or Firm*—Browdy and Neimark, P.L.L.C.

(57) ABSTRACT

A photon detector has a photocathode for the photon-induced triggering of measuring electrons. Spatial position information is supplied by an at least one-dimensional electron-detector pixel array. An electron optics unit serves for guiding the measuring electrons to the array. Each pixel (19) has an electronic converter unit (20) for converting an analog measuring signal of the pixel (19) into a digital measuring signal, which incorporates a discriminator for background suppression. An electronic post-processing unit (39) serves for processing the digital measuring signal. The converter unit (20) of each pixel (19) has at least one clock generator (36), as well as at least one counter (29, 30), which is in signal connection with the clock generator (36) and discriminator (27) for generation of a digital timing signal. The timing signal is such that it[1] from the number of clock cycles between a time-reference point and the moment ($t^{measurement}$) of the arrival of an analog measuring signal not suppressed by the discriminator (27). The result is a photon detector in which not only the position information can be derived from the measuring signal but additionally also the information when the measuring signal was triggered at the given pixel.

[1] Translator's note: This transition is based on an incomplete German-language sentence.

20 Claims, 5 Drawing Sheets

U.S. PATENT DOCUMENTS

2002/0175292 A1* 11/2002 Whitehouse et al. ........ 250/394
2004/0140432 A1* 7/2004 Maldonado et al. ...... 250/423 P
2004/0267488 A1* 12/2004 Strommer ................... 702/127
2006/0011849 A1 1/2006 Tseng et al.

OTHER PUBLICATIONS

C.D'Ambrosio, H. Leutz, "Hybrid Photon Detectors" Nuclear instruments & Methods in Physics Research section A, p. 463-498; (particularly Sections 3.1, 3.2, 3.3) Jan. 16, 2003.

C. D'Ambrosio et al, CERN PH/DT2 "Particle Detectors-Principles and Techniques," Lecture 3b-Photo-Dection, CERN Academic Training Programme 2004/2005.

K. Wyllie et al., "Readout of the LHCb pixel hybrid photon detectors"; Nuclear Instruments and Methods in Physics Research, Section A 546 (2005) 86-92.

International Search Report for PCT/EP2007/005072; dated Aug. 2007.

* cited by examiner

PHOTON DETECTOR FOR PHOTON-INDUCED TRIGGERING OF MEASURING ELECTRONS

This application claims benefit to provisional application No. 60/815,833 filed 23 Jun. 2006.

The invention relates to a photon detector according to the precharacterizing portion of claim 1.

Embodiments of photon detectors of this type with a pixel array are known from a lecture script by Thierry GYS, "Particle Detectors—Principles and Techniques (3/5)", Lecture 3b, CERN Academic Training Programme 2004/2005.

A photon detector of this type may be used to obtain a position information for the impinging measuring photon. Temporal information may be gathered by analyzing the analog measuring signal, which is detected with a resolution of approximately 10 ns. Correlating the position information that is obtained through the electron-detector pixel array with the temporal information is possible only to a very limited degree, if at all.

It is therefore an object of the present invention to improve a photon detector of the above type in such a way that it is possible to derive from the measuring signal, in addition to the position information, also the information when the measuring signal was triggered at the given pixel.

This object is met according to the invention with a photon detector having the features specified in the characterizing portion of claim 1.

In accordance with the invention it was realized that a measurement process with a high time resolution is possible by using a clock generator and a counter that registers at least the number of clock cycles, such that, in addition to the position information, the complete temporal information can be acquired as well. The photon detector supplies measuring data from which it can be inferred when a measuring signal was triggered at a certain position of the electron-detector pixel array. This is done by utilizing the fact that, first of all, the analog measuring signal is not digitized in a time consuming manner with an A/D converter, but quickly into a digital timing signal, which represents the number of registered clock cycles. The clock generator may, for example, supply a cycle frequency of 500 MHz. The discriminator especially serves to provide background suppression.

Counting modes according to claims 2 and 3 have proven advantageous for the generation of the digital timing signal.

Presetting a time-reference point according to claim 4 requires only minor effort. The repetition frequency of the preset time-reference point may be 10 kHz, for example.

A counter arrangement according to claim 5 permits a time measurement process without dead-time. This means that the complete position and temporal information can be obtained even over longer periods of time.

A counter arrangement according to claim 6 results in a time resolution that is better than can be achieved based on the cycle frequency of a clock generator when only one counter is used. The two counters may be supplied by the same clock generator. Alternatively, however, a supply with two synchronized clock generators is possible as well. If two counters are used that are supplied by the same clock generator, it is possible to delay the cycle input of one of the two counters relative to the cycle input of the other of the two counters, so that the cycle pulses that are registered by the first counter lie in a time interval between adjacent cycle pulses that are detected by the second of the two counters. Alternatively, it is possible to have a time delay in the discriminator signal that is sent to one of the two counters, relative to the discriminator signal that is sent to the other of the two counters, so that here, too, the result is that cycle pulses that are registered by the first of the two counters lie in a time interval between adjacent cycle pulses that are registered by the second of the two counters.

A readout unit according to claim 7 is fast.

Improvements of the post-processing unit according to claims 8 and 9 reduce the data quantity that needs to be post-processed.

The integration according to claim 10 produces a compact photon detector.

A discrete pixel structure according to claim 11 reduces the risk of pixel crosstalk.

A pixel structure according to claim 12 can be implemented in a compact fashion.

An attenuation layer according to claim 13 prevents that undesired erroneous measuring signals are triggered by measuring electrons that are backscattered from the electron-detector pixel array.

Exemplary embodiments of the invention will be explained in more detail below, based on the drawing, in which.

Figure 1:
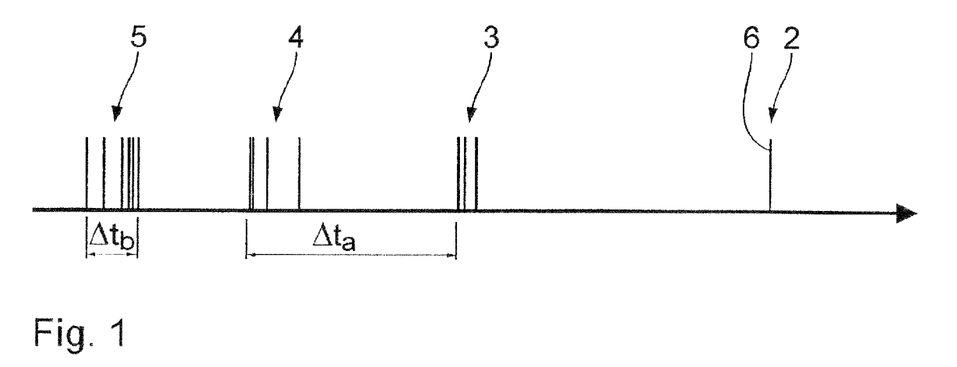
FIG. 1 schematically depicts a photon event to be measured, on a time scale in order to represent various time intervals associated with it.
Figure 2:
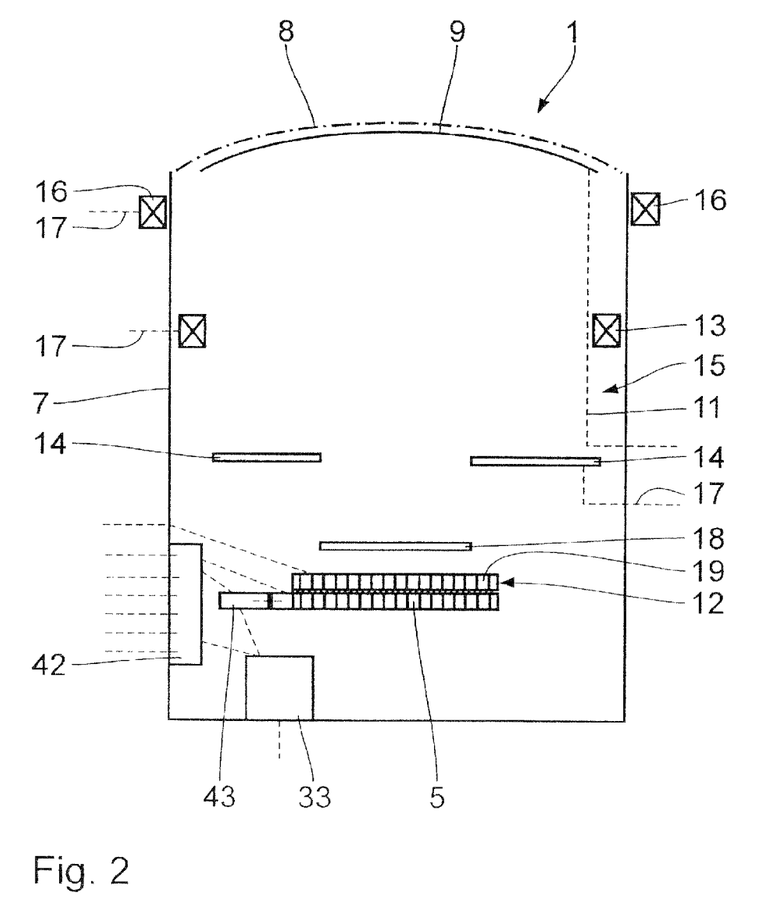
FIG. 2 shows an embodiment of a photon detector.

A photon detector, which is marked in its entirety with reference numeral 1 in FIG. 2, operates to measure a temporal succession of photon pulses as the measuring signal. One example for such a temporal succession of four photon pulses 2, 3, 4, 5, which are incident on a surface that is not depicted, is shown in FIG. 1. A photon pulse 2 through 5 consists of at least one photon 6 that impinges on the surface during a time period $\Delta t_b$, which is referred to as photon pulse duration or photon pulse width. Photon pulses 2 through 5 that are adjacent in time have intervals $\Delta t_a$ between pulses, which are referred to as photon pulse intervals. The mean photon pulse interval of a multitude of successive photon pulses corresponds to a frequency, referred to as repetition rate. During the photon pulse duration of a photon pulse, individual photons 6 generally impinge at different positions of a measuring surface. Each photon 6 within a photon pulse 2 through 5 has a short time interval, referred to as photon interval, to the photon 6 of the same photon pulse 2 through 5 that impinges on the surface closest in time, as compared to the photon pulse interval. The photon intervals are between zero and the photon pulse duration. It is possible that in one or more photon pulses only one photon impinges on the surface in each case. Depending on the temporal resolution of the photon detector 1, the same may resolve the photon interval, the photon pulse width, or the photon pulse distance.

Figure 3:
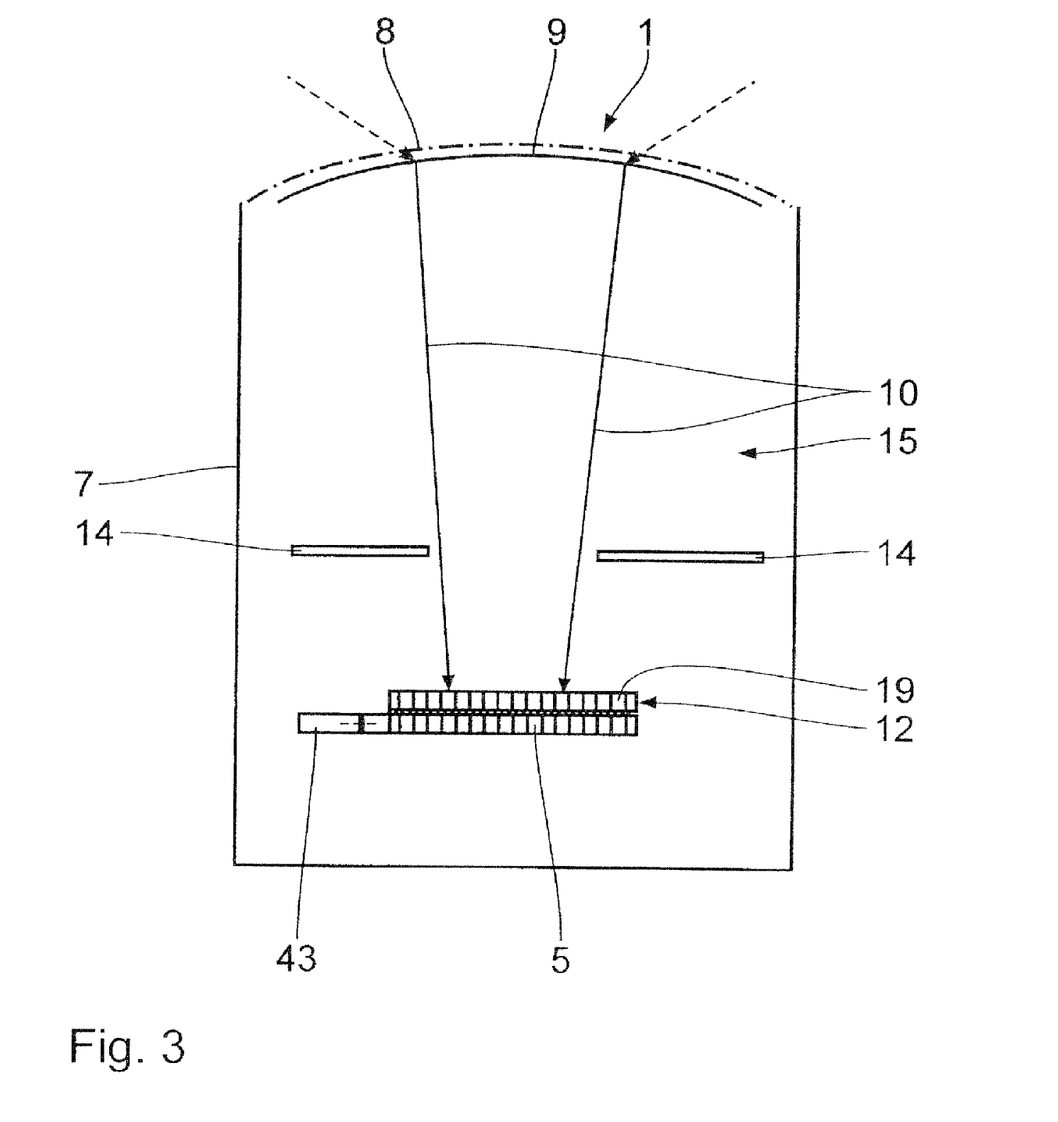
FIG. 3 shows the photon detector of FIG. 2 during a measuring process, certain details having been omitted as compared to FIG. 2.

The photon detector 1 depicted in FIG. 2 has a housing 7 with an entry window 8, which is marked in a dot-and-dash pattern in FIG. 2 and transparent for the photons 6. The housing 7 encompasses a photocathode 9 that is disposed directly behind the entry window 8. The surface of the photocathode 9 on which measuring photons can impinge, at the same time also provides the measuring surface. The photocathode 9 consists of a layer from which, when photons 6 are incident, photoelectrons can be knocked off, whose paths 10 are shown in FIG. 3 by way of example. After the liberation process, the photoelectrons are located on the side of the photocathode 9 facing away from the entry window 8. The photocathode 9 may consist of an alkali-metal containing material and may be vapor-deposited onto the rear of the entry window 8. Via an electrically conductive supply connection 11, the photocathode 9 is connected to an electronic power/voltage supply, which is not shown. The photocathode 9 is at a negative potential relative to the electron-detector pixel array 12, which will be described later, and relative to one or more electrodes adjacent to the electron-detector pixel array 12.

Also disposed in the housing 7 are at least one coil 13, as well as plates or wires 14 of an electron optics unit 15. The electron optics unit 15 additionally includes a coil 16 that is disposed outside the housing 7. The components 13, 14, and 16 of the electron optics unit 15 are connected via supply connections 17 to the not depicted power/voltage supply.

When the photon detector 1 is in operation, the plates or wires 14 of the electron optics unit 15 and the photocathode 9 generate an electric field, which accelerates the photoelectrons. When the photoelectrons impinge on the detector setup, they preferably have an energy that is noticeably greater than the energy of the incident photons 6. This impingement energy may be 20 keV, for example. The photoelectrons move in this field with a preferred direction from the photocathode toward the electron-detector pixel array 12. The field progression and field strength of the electrical field are influenced by the shape, size and positions of the photocathode 9 and of the electrically conductive plates or wires, as well as by the electrical voltages applied to these components.

The field distribution may be designed, through selection of the shape, size and position of the photocathode 9 and of the electrically conductive plates 14 as well as of their voltages, in such a way that a mapping that is biunique in good approximation is obtained of the position of the triggering process of the photoelectron onto the position of the impingement of the accelerated photoelectron on the array of detectors. The coils 13, 16, when an electric current flows through them, generate a magnetic field that influences the paths of the photoelectrons and thus leads to the modification of the electron-optical mapping. This can serve to optimize the electron-optical mapping.

The mapping characteristic of the electron optics unit 15 can be calculated in good approximation with the aid of known electron transport programs, and can be optimized in the design of the unit. It may be assumed that the mapping rule B: $(x^{photocathode}, y^{photocathode}) \rightarrow (x^{array}, y^{array})$ for photoelectrons is known, well-defined, and biunique in good approximation between small surface elements $\Delta x^{photocathode} \cdot \Delta y^{photocathode}$ at the position $(x^{photocathode}, y^{photocathode})$, and $\Delta x^{array} \cdot \Delta y^{array}$ at the position $x^{array}, y^{array}$. If a mapping is biunique, this means that a surface element $\Delta x^{photocathode} \cdot \Delta y^{photocathode}$ in which the photoelectron was triggered can be determined in good approximation from all impingement positions from each surface element $\Delta x^{array} \cdot \Delta y^{array}$ in which an accelerated electron arrived and was detected. This can be accomplished, for example, through use of the inverted mapping rule or through the use of lookup tables in the readout unit or in connected evaluation units. The electron-optical mapping may be designed such that the cathode surface elements that are defined by $\Delta x^{photocathode} \cdot \Delta y^{photocathode}$ are greater than the associated sensor surface elements $\Delta x^{array} \cdot \Delta y^{array}$. In this case the mapping has a reducing effect. This situation is shown in FIG. 3.

The electron-optical mapping, however, may also be designed such that the cathode surface elements defined by $\Delta x^{photocathode} \cdot \Delta y^{photocathode}$ are smaller than the associated sensor surface elements $\Delta x^{array} \cdot \Delta y^{array}$. In this case the mapping has an enlarging effect. In this case of an enlargement, the total cathode surface may be designed smaller than the total sensor surface. In this way the maximally processable photon flow can be increased.

Between the electron-detector pixel array 12 and photocathode 9 an attenuation layer 18 is disposed of a material that serves to absorb electrons that are backscattered by the electron-detector pixel array 12 toward the photocathode 9, which move in the direction of the photocathode 9. This takes advantage of the fact that the energy of the backscattered electrons is smaller than the energy of the accelerated photoelectrons and their energy loss during their passage through the attenuation layer is therefore greater than the energy loss of the accelerated photoelectrons. With an appropriately selected material and thickness of the layer, this reduces the percentage of unwanted multiple responders.

The photoelectrons impinge on the electron-detector pixel array 12 after or during their acceleration in the electrical field. The electron-detector pixel array 12 consists of at least one row of detector pixels 19, i.e., it is designed at least one-dimensionally. As a rule, the pixel array 12 has a matrix composed of detector pixels 19 that are arranged in rows and columns. For example 65536 such detector pixels 19 may be arranged as a 256×256 matrix. A 32×32 matrix, for example, is also possible.

The following description assumes that the detector pixels 19 are arranged in rows and columns. Each detector pixel 19 is uniquely identified through indication of the line i and column j.

Figure 4:
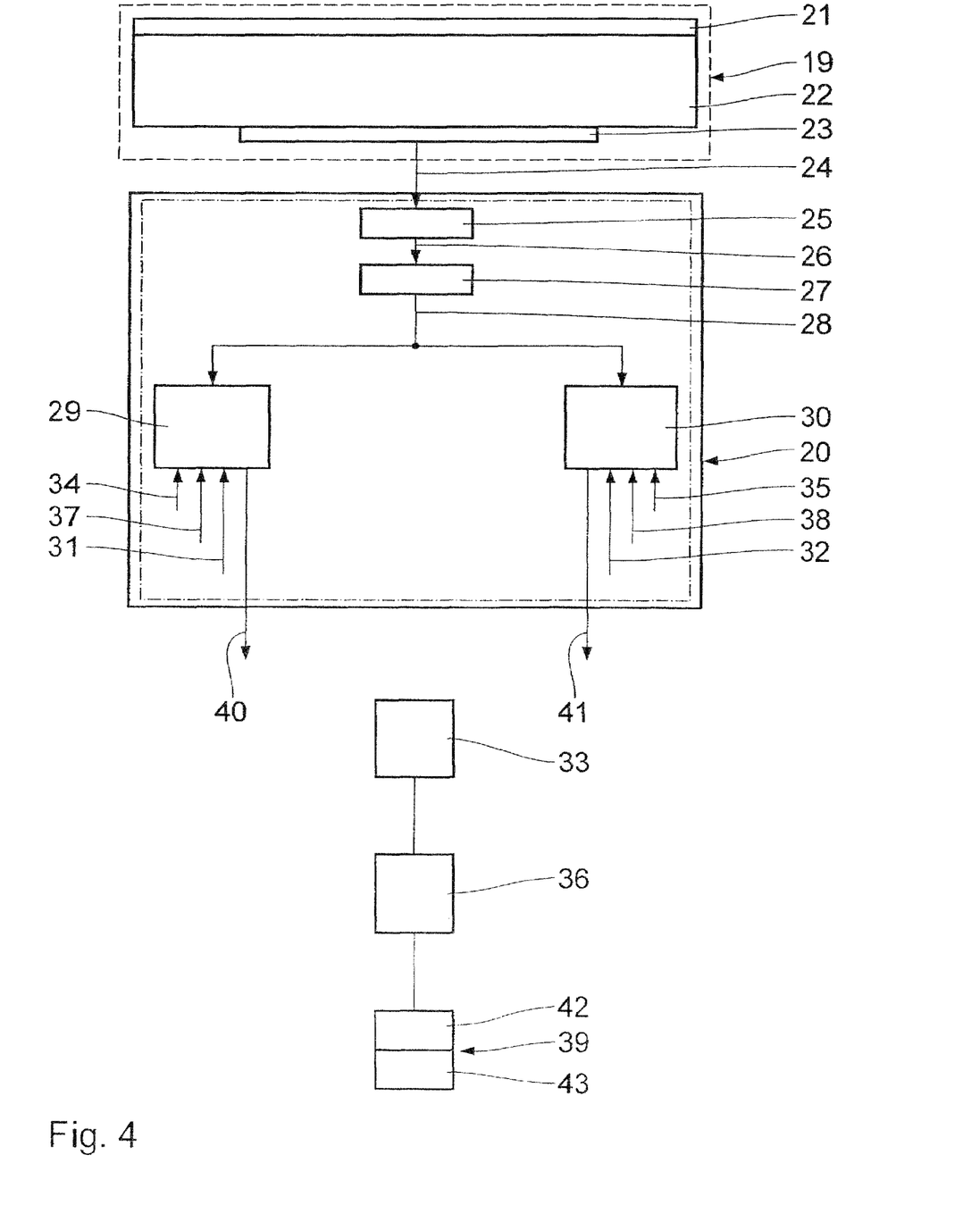
FIG. 4 shows, schematically and in greater detail, a pixel of an electron-detector pixel array of the photon detector of FIG. 2.
Figure 5:
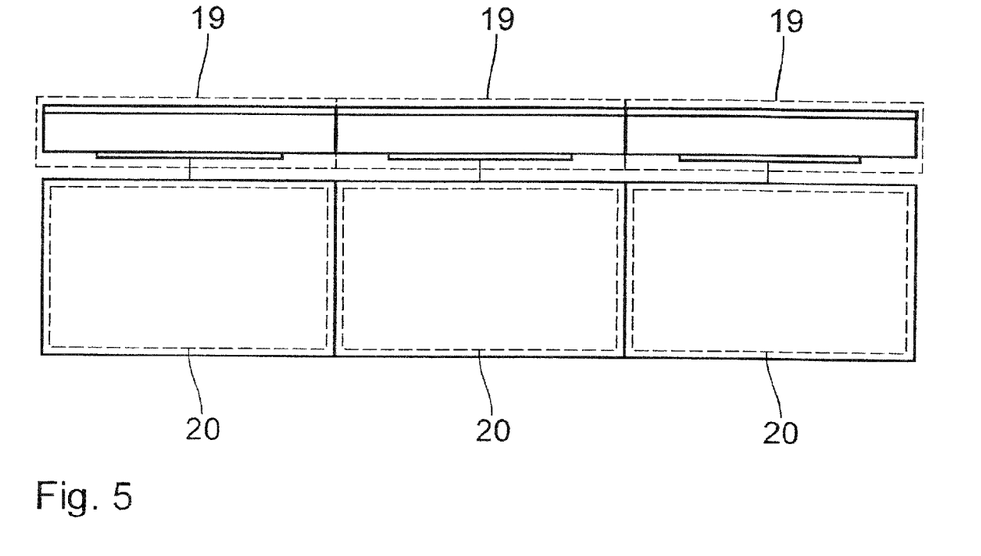
FIG. 5 shows a section of the electron-detector pixel array, with individual pixels depicted more schematically as compared to FIG. 4.
Figure 6:
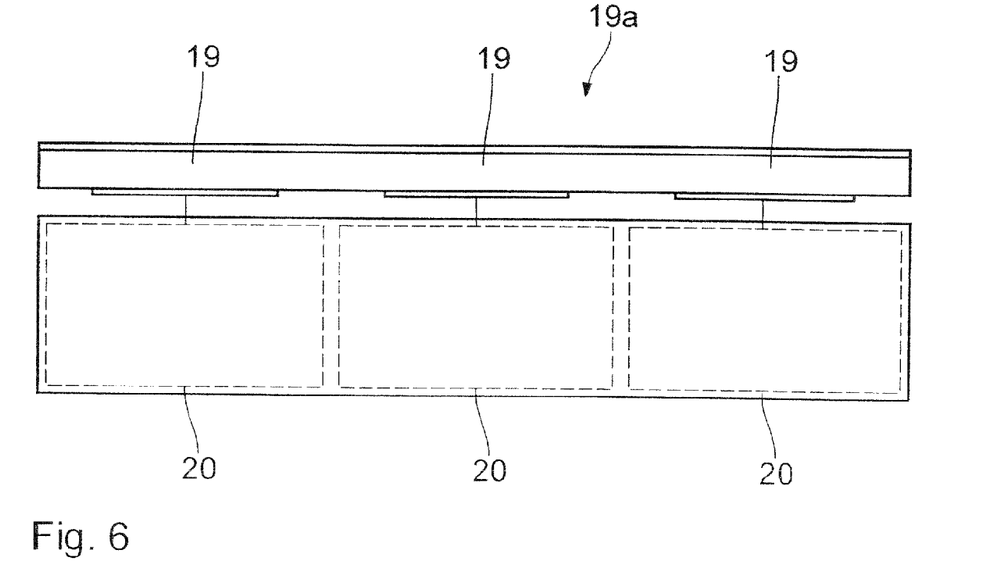
FIG. 6 shows a section similar to FIG. 5, of an additional embodiment of an electron-detector pixel array.

FIG. 4 shows in greater detail the design of one of the detector pixels 19 together with an electronic converter unit 20 assigned to the detector pixels 19 and additional electronic components. FIGS. 5 and 6 show embodiment variants of detector pixels 19 that are arranged side by side. Each detector pixel 19 has, under a detector electrode 21, a sensitive sensor layer 22, which is connected via an additional detector electrode 23 and a signal line 24 to a pulse formation unit 25 of the converter unit 20.

The converter units 20 for all detector pixels 19 are combined in a chip in an integrated circuit, which is not shown.

The term "detector pixel" that is used here, is meant to illustrate that a measurement with spatial resolution is performed with the electron-detector pixel array 12. The individual detector pixels 19 may be implemented as discrete entities, as shown in the embodiment of FIG. 5, but they may also be segments of a continues sensor layer 19a, as shown in the embodiment of FIG. 6, wherein the position resolution is ensured due to the spatial proximity of the given sensor-layer segment to its associated converter unit 20. The detector pixels can thus be mechanically connected to one another via the sensor layer 19a. Both variants of the detector pixels 19 shown in FIGS. 5 and 6 can be integrated in a common chip to form an electron-detector pixel array 12.

In the pulse formation unit 25, a preamplification, integration, or other analog processing of the analog measuring signal that is generated by the measuring electron impinging on the detector pixel 19 may be performed.

The sensor layer 19a of the detector pixel 19 is composed of a semiconductor material. If a photoelectron that is triggered from the photocathode 9 impinges at the end of the photoelectron path 10 on the detector pixel 19, it releases, through jolting processes in the sensor layer of the detector pixel 19, electron-hole pairs. Depending on the direction of the electrical field that is in place between the detector electrodes 21, 23, either electrons or holes drift toward the detector electrode 23 facing the converter unit 20. This generates, in the signal line 24, a current signal, also referred to below as analog measuring signal, which is initially preprocessed in the pulse formation unit 25.

The pulse formation unit 25 is in signal connection, via an additional signal line 26, with a discriminator 27. In the latter, a threshold value is stored. The threshold value of the discriminator 27 is set to a value that is smaller than the maximum signal that an individually accelerated photoelectron having the maximum energy that it can gain in the electron optics unit 15 will trigger in the input of the converter unit 20. The attenuation through the attenuation layer 18 will also be taken into account in this context, of course. In the discriminator 27 the processed analog measuring signal is analyzed after the pulse formation unit 25 with respect to its strength through comparison with the threshold value. If the processed analog measuring signal exceeds the threshold value, the discriminator 27 allows the processed analog measuring signal to pass through. The latter is routed to a counter signal line 28. This routed signal will also be referred to below as a counter trigger or trigger signal. Alternatively to letting the analog measuring signal pass through, it is possible for the discriminator 27 to generate a carrier signal when the threshold value is exceeded. In the converter unit 20, there may be other discriminators provided as well, in addition to the discriminator 27.

The counter signal line 28 is connected to two counters 29, 30 of the converter unit 20. Alternatively, it is also possible to connect the discriminator 27 to the two counters 29, 30 via two separate counter signal lines 28. The two counters 29, 30 are connected via enable lines 31, 32 in a manner that is not shown in detail to a counter-switching control unit 33. On the enable line 32, the inverted signal of the enable line 31 is present in each case. The two counters 29, 30 are supplied via signal lines 34, 35, that are connected in a manner not shown in detail to a clock generator 36 with a counting cycle. The clock generator supplies clock pulses with a frequency of e.g., 500 MHz. Via control lines 37, 38, the counters 29, 30 are in signal connection, in a manner not shown in detail, with an electronic post-processing unit 39. The counters 29, 30 additionally are in signal connection with the post-processing unit 39 via readout lines 40, 41. One of the counters 29, 30 of a detector pixel may be connected in each case via other counters of other detector pixels to the post-processing unit 39. The counters that are connected to each other in this manner may be designed along the line of a shift register, which simplifies reading of the counters.

The trigger signal that was allowed to pass through by the discriminator 27 on the counter signal line 28 triggers a counter measurement in the respective active counter 29, 30. The trigger signal for the respective active counter 29, 30, may represent either a counting-start or counting-stop signal.

In the alternative of a counter-start signal, the active counter 29 or 30 starts to count the clock pulses upon arrival of the trigger signal, until the next time-reference point $t_{start}$ that is specified by the post-processing unit 39, so that the moment of impingement of the photon $t^{photon}$ that triggered the analog measuring signal is uniquely determined.

In the variant of the counter-stop signal, the respective active counter 29 or 30 ends its counting process, which started at the previous time-reference point $t_{start}$ specified by the post-processing unit 39. This, too, therefore provides for a precise definition of the moment of impingement $t^{photon}$ of the photon that triggered the analog measuring signal.

The following description of the photon detector 1 is based on the variant of the counter-start signal.

The counter reading that is measured by the respective active counters 29, 30, i.e., the number of clock pulses between the time-reference point $t_{start}$ and the time $t^{measurement}$ of the arrival, at the active counter 29, 30, of the analog measuring signal that was not suppressed by the discriminator 27 represents a digital timing signal with which the moment of impingement of the measured photon 6 is uniquely determined. $t^{measurement}$ is delayed relative to $t^{photon}$ by the run time of the discriminator signal to the counter. The moments $t^{photon}$ and $t^{measurement}$ have a fixed time interval between them, which is strictly an apparatus parameter. $t^{photon}$ and $t^{measurement}$ as a point in time therefore have the same information content.

In the converter unit 20, each of the two counters 29, 30, may also have an associated additional counter. The same is designed such that it counts clock pulses of the same frequency as the clock pulses of the counter 29, 30 with which it is associated. This additional counter is wired to the clock generator 36 in such a way that the clock pulses arrive at the additional counter with a fixed time delay, or are registered by it with a fixed time delay. This delay preferably amounts to half the interval between two successive clock pulses. By calculating the difference between the counter readings of the respective active counter 29 or 30 and the additional associated counter, a time resolution can be achieved in this manner that is better than when only one counter 29, 30 is used. The time-reference points follow each other successively in a fixed frequency and have a time interval of $\Delta T_{measuring\ phase}$. When the next time-reference point is reached during the operation of the photon detector 1, the counter switching control unit 33 reverses the enable signal, so that the previously inactive counter, e.g., the counter 30, now becomes active, whereas the previously active counter, in this example the counter 29, ends its counting process, which it may have started depending on the arrival of a triggered photoelectron. The counter 29 then reports its counter reading via the readout line 40 to the post-processing unit 39. The post-processing unit 39 initially registers the counter readings of all active counters 29 of the electron-detector pixel array 12 in the form of an i×j matrix. After the readout via the readout line 40 of each converter unit 20, the counters 29 that have been read are reset to zero via the control line 37. All of this takes place while the other counter 30 is ready to measure. After the resetting, the inactive counter 29 waits until the next time-reference point is reached. The enable signal is then again reversed and the counter 29 starts to count while the counter 30 is being read according to the above-described process. This allows for a measuring process without dead-time.

The time-reference points are set with a frequency of 10 kHz, for example. The readout frequency of the photon detector 1 accordingly is 10 kHz as well.

In the post-processing unit 39, an evaluation of the counter readings takes place. All counter values of zero belong to detector pixels 19 at which no photoelectron was registered during the measuring time of the counter.

A data reduction can be achieved, in addition to the above-described ignoring of counter readings of zero, also by combining data for counter readings that have the same value, i.e., data where a measuring signal was triggered simultaneously at different detector pixels 19.

The time and position resolved data that are routed via the readout line 40, 41 of the converter units 20 of all detector pixels 19 to the post-processing unit 39, can be post-processed with algorithms after completion of multiple measuring phases between time-reference points that are adjacent in time, or after completion of each individual measuring phase. With a transmission unit 42, a transmission to externally connected devices, as well as display and storage, are possible as well.

In addition to the transmission unit 42, the post-processing unit 39 also includes a readout unit 43. The readout unit 43 has the function to read out and possibly process or reduce the counter readings of the detector pixels 19 after the end of their respective measuring period. It may add information, such as the addresses of the struck detector pixels 19. The data are routed from the readout unit 43 to the transmission unit 42. The output data of the readout unit 43 are present in digital form.

The readout unit 43 is an electrical circuit, the components of which are preferably implemented as integrated circuits. The electronic subunit of the readout unit 43, which substantially serves for reading out the counter readings, is preferably implemented as an integrated circuit on the chip that houses the detector electronics unit and is therefore disposed inside the case. This results in a compact arrangement of the detector pixels 19, and components of the readout unit 43, and post-processing unit 39, respectively. Components of the readout unit 43 and/or post-processing unit 39 which, for example, serve for the evaluation, may also be situated outside the case. The readout unit 43 may consist of multiple electric circuits.

The counter readings are transmitted during the readout phase to the readout unit 43, sequentially or in groups. The readout unit 43 operates, e.g., in the style of a shift register. In the process, the counter readings of the respective counters 29, 30 to be read are routed to the readout unit 43 and pushed out into the same by rows. The counters 29, 30, may function as shift registers during the readout phase as well.

The readout unit 43 transmits the counter readings, optionally supplemented with address information identifying the detector pixels 19 that belong to the counter readings, or a subset of counter readings and address data, or values that have been calculated from the counter readings and address data, to the transmission unit 42.

In the readout unit 43, all moments or positions of a registration of electrons in the detector pixels 19 can be determined, and from them the moments or positions of the arrival of the corresponding photons from the counter readings. A number of possible methods for determining the values will now be explained. The mean flight time $\Delta t_{ij}^{photoelectron}$ of the photoelectrons from their trigger point to the point of impingement on the sensor of the detector unit in row i and column j can be calculated from the electric and magnetic field progression. The flight time can be used in the calculation of the moment of impingement of the photon on the photocathode. Likewise, the duration $\Delta t^{conversion}$ between the arrival of the electron on the sensor and the moment of the start process of the counting of clock pulses associated with this impingement can be determined by means of calculations or measurements. For the moment $t^{photon}$ of the impingement of the photon on the cathode, the following therefore applies in good approximation: $t_{ij}^{photon} = t_{start} + (\Delta T_{measuring\ phase} - N_{ij} \cdot \Delta t_{clock}) - \Delta t^{conversion} - \Delta t_{ij}^{photoelectron}$ for all i and with $N_{ij} > 0$. $t_{start}$ denotes the previous time-reference point in each case. $\Delta t_{clock}$ denotes the time interval between two clock pulses. $N_{ij}$ denotes the counter reading of the respective active counter of the converter unit 20 of the detector pixel 19 in row i and column j. The above-defined points in time $t^{measurement}$ are given by: $t_{ij}^{measuring\ path} = t_{start} + (\Delta T_{measuring\ phase} - N_{ij} \cdot \Delta t_{clock})$ for all i and j with $>0$.

By defining a quantity of numbers, $\Phi_{ij}^{photoelectrons} = 1$ if $N_{ij} > 0$ and $\Phi_{ij}^{photoelectrons} = 0$ if $N_{ij} = 0$, one obtains a sampling of the spatial distribution of the impingement positions of the photoelectrons on the detector array. If the sensor surface of each detector pixel is small, it can be assumed in approximation that the photoelectrons impinged in the geometric center of the sensor surface of the detector pixel in row i and column j, characterized by the position $(x_{ij}^{array}, y_{ij}^{array})$. The sampling of the distribution of the photoelectron trigger positions, and thus in good approximation of the impingement positions of the photons that resulted in photoelectrons, is accordingly obtained from the counter reading of all detector pixels as follows:

$\Phi^{photons}(x_{ij}^{photocathode}, y_{ij}^{photocathode}) := \Phi_{ij}^{photoelectrons}$
with $(x_{ij}^{photocathode}, y_{ij}^{photocathode}) = B^{-1}(x_{ij}^{array}, y_{ij}^{array})$.

The association $(x_{ij}^{array}, y_{ij}^{array})$ to $(x_{ij}^{photocathode}, y_{ij}^{photocathode})$ may be performed, for example, by means of a lookup table or mathematical algorithm in the readout unit in an externally connected electronic unit. This association may also be performed after the fact, after the completion of all measuring phases.

If one defines $\Phi^{photons}(x_{ij}^{photocathode}, y_{ij}^{photocathode}, t_{ij}^{photon}) := \Phi_{ij}^{photoelectrons}$ at the above-defined moment $t_{ij}^{photon}$ of the impingement of a photon whose triggered photoelectron was registered in the detector pixel in row i and column j, one obtains a sampling of the spatial and temporal distribution of the incident photons that triggered photoelectrons. The moment of the impingement of the first photon whose photoelectron was registered is given by $t_{mn}^{photon}$, wherein $t_{mn}^{photon} < t_{ij}^{photon}$ must apply for all i, j with i≠m and j≠n. By using a simple algorithm, implemented in the readout unit or in external units, it is thus possible to calculate the start time of a photon pulse that impinges on the cathode, and bring it to display in external units.

If one divides the measuring time $\Delta T_{measuring\ phase}$ into N time intervals of equal duration, one obtains a sequence of (N+1) points in time $T_i^{intervall} = t_{start} + i \cdot \Delta T_{measuring\ phase} / N$, if i takes whole-number values from 0 to N. If, in the readout unit or in an external evaluation unit, the number $A_k$ (A as in Amplitude) of all detector pixels of the entire array whose counter readings have time entries $t_{ij}^{photon}$ in this interval $I_k$ is determined for each interval $I_k = [T_k^{intervall}, T_{k+1}^{intervall}]$, with k taking whole-number values from 0 to (N−1), the sequence $A(t_k) := A_k$ with $t_k = (T_k^{intervall} + T_{k+1}^{intervall})/2$ that is obtained in this manner represents a chronologically equidistant reading of the pulse form of the photon pulse that was incident on the photocathode during a measuring period.

A sampling of the pulse form of the photon pulse that is usually not chronologically equidistant is obtained by ascending sorting of the times $t_{ij}^{photon}$ of the times that are individually determined from the counter readings of all detector pixels, or through descending sorting of the counter readings of the detector pixels that registered a photoelectron during the measuring period. This sorting may also be performed by the readout unit or by external units for the times that were registered in each case within a certain interval $I_k$. These sorting and evaluation processes may also be performed with a limitation to certain subsets of the number of all counters, for example to counters for certain regions of the detector pixel array, and performed by the readout unit or by external units. In this manner pulse forms of photon pulses can be sampled that triggered electrons in different regions of the photocathode. These pulse-form sampling processes are performed in the readout unit or in the external evaluation unit as algorithms. A sampling of this type is the equivalent of an analog output pulse of a photo multiplier digitized in time. When a photo multiplier is used, the digitized form of this pulse is obtained, as a rule, by using a FADC (Fast Analog Digital Converter).

Moreover, characteristic points in time of the distribution of the moments of impingement of the photons can be determined in the readout unit. An example for this is the determination of the moment of maximum photon flow or the determination of the moment of the arrival of the first photon. These values can easily be determined from the sequence $A(t_k)$. The number of photons in an interval in the vicinity of the moment of maximum photon flow can be determined as well. The number of photons in an interval in the vicinity of the maximum is obtained as $A(t_m)$, wherein $A(t_m) \geq A(t_i)$ must apply for all $i \neq m$. When a photo multiplier is used, a value is obtained that is equivalent to the number of photons in the maximum, for example by using a pulse height ADC that is connected to the output of the photo multiplier.

An additional value that can be determined is the sum of the photons $E_{u \to v}$ that fell on the surface with a photon pulse and triggered photoelectrons:

$$E_{u \to v} = \sum_{k=n}^{v} A(t_k),$$

u being the number of the time interval in which the first photon fell on the surface. v denotes the number of the interval in which the end time of the photon pulse lies. These intervals are easily determined from the above-described sorting of the counter readings.

This value $E_{u \to v}$ is equivalent to the charge that would have flown in a corresponding analog photo multiplier pulse triggered by the photon pulse. If a photo multiplier is used, this value is obtained, for example, by using a QDC (Charge (Q) Digital Converter) connected to the output of the photo multiplier.

As has already been described above, two photon pulses can be distinguished from each other in such a way that the two associated incident photon ensembles impinge on the surface either with a time difference that is greater than the duration of the photon pulses, or with a spacing of the main impingement positions that is large relative to the spatial extent of the individual photon pulses. The information that is generated by the device that we have invented, permits both the spatial as well as the temporal isolation of closely spaced photon pulses.

In the readout unit or in external units an algorithm may search for and identify a number of detector pixels that simultaneously registered, with a slight time delay relative to each other, photo electrons that lie within the expected photon pulse width. The assumption could then be made that the photoelectrons registered in the thusly identified number of detector pixels originate from an individual photon pulse. The spatial and temporal distribution of the photons of this pulse can then be determined according to the above-described processes by limiting the calculations and analyses to the thusly identified quantity of detector pixels. Values such as, for example, the total number of photons in this pulse, the maximum number of photons in one of the short time intervals $I_k$, the moment of the arrival of the first photon of this photon pulse, or other characteristic times can be determined analogous to the above processes from the counter readings of the identified detector pixels.

Likewise, a search can be performed for quantities of detector pixels in specifiable regions in the array of detector pixels, and these can be identified if they have registered a photoelectron within a specifiable time interval, which should correspond to the photon pulse width. The assumption may then be made that the photoelectrons registered in the detector pixels of a region originate from the same photon pulse. Limiting the above-described evaluation processes to these quantities of thusly identified detector pixels of a region provides information regarding the spatial and temporal distribution of the arrival of the photons of the corresponding photon pulses on the photocathode. This possibility opens up new opportunities in the manufacture of large-surface detection units for photons. By using photo multipliers, position information is obtained during the detection of particles with scintillation counters, either by using multiple photo multipliers or by using photo multipliers with segmented cathodes, which are optically coupled via light-wave guides to certain regions of the radiation-sensitive medium. With the unit that we have invented, it becomes possible in certain cases to dispense with the use of light-wave guides. With a suitable design of the electron optics unit and small sensitive detector regions, the position resolution of the device that we have invented can be significantly better than the position resolution that is attainable with the use of segmented photo multipliers or with the use of light-wave guides combined with multiple photo multipliers.

A photo electron that deposits energy in the sensor can, under certain circumstances in closely adjacent detector pixels, cause a nearly simultaneous triggering of a discriminator pulse. This effect can occur when a pixelized semiconductor detector is used for example, due to the charge-sharing effect. In the process, the distribution of free charge carriers that drift in the electrical field of the sensor may, when it arrives at the pixel electrode, also reach adjacent pixel electrodes, which results in the nearly simultaneous response of the two detector pixels. In the readout unit these events can be identified, since they are characterized by the fact that the almost simultaneously responding detector pixels have very slight differences in the counter readings that have been read. These events can be seen in the readout unit or in externally connected units during the evaluation process as belonging to only one incident photon.

The data generated in the readout unit or the counter readings with the possibly added position information regarding the detector pixels belonging to the counter readings can be transmitted, via the transmission unit, via an integrated circuit with connected cable, or via an optical fiber, or directly via an electrical cable or optical fiber, to external devices for display or further processing of the data.

Figure 7:
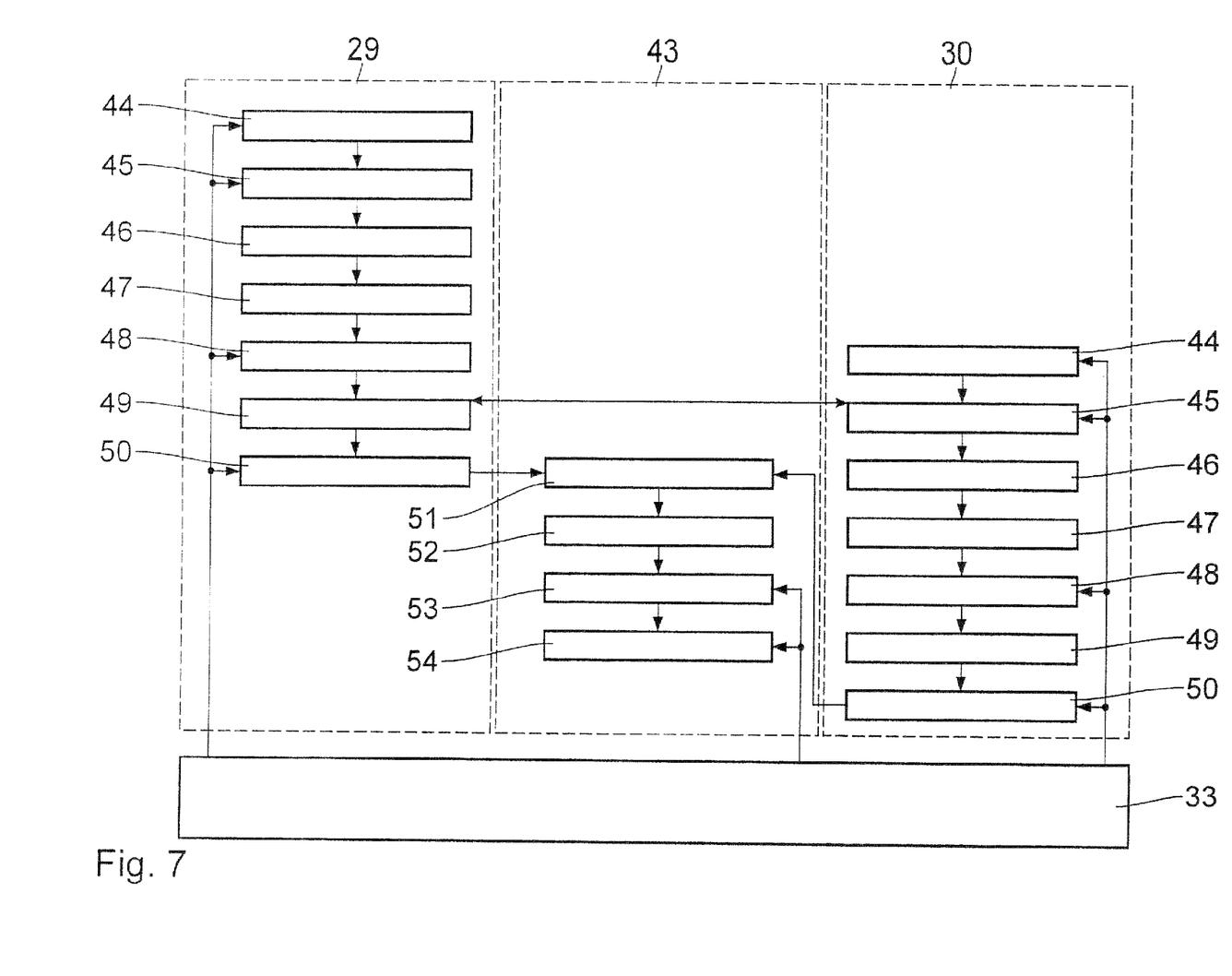
FIG. 7 schematically depicts a flow diagram for the generation and transmission of a digital timing signal in the photon detector using two counters per pixel, between which a synchronization and dead-time free switching takes place via a counter-switching control unit.

FIG. 7 is a schematic depiction of the steps that take place during the measuring process. 44 denotes the initialization step of the counter 29. During the placing-in-readiness step 45, the counter 29 is ready for counting and the counter 29 is switched to "enable" for the next time-reference point. 46 marks the triggering of the counter 29 by the triggering signal, i.e., a trigger step. 47 and 48 denote the counting phase of the counter 29. 49 denotes the completion of the counting process. Simultaneously with the completion step 49, the placing-in-readiness step 45 takes place at the counter 30, synchronized via the counter-switching control unit 33. 50, 51 denote a transfer step of the counter reading of counter 29 from counter 29 to the readout unit 43. 52 denotes a deletion step for the counter reading, to the effect that it is zero, for example. At 52, if the counter reading is not deleted, an address information is added that permits inferences from the counter reading to the position ij. During the transmission step 53 the counter readings that have not been deleted are transmitted with their addresses to the transmission unit 42. Additionally, in the transmission step 54, the counter readings that have not been deleted and the associated addresses are transmitted to external units or stored. The steps 44 through 50 take place in the counter 30 in the same manner, staggered in time by the interval between two successive time-reference points.

The primary applications of the photon detector 1 are the performance of experiments in nuclear, particle and astroparticle physics, the use in positron emission tomography equipment, in a single-photon emission computed tomography camera, in X-ray image intensifiers, or as night-vision device.

What is claimed is:

1. A photon detector (1)
   incorporating a photocathode (9) for the photon-induced triggering of measuring electrons;
   incorporating an at least one-dimensional electron-detector pixel array (12);
   incorporating an electron optics unit (15) for guiding the measuring electrons to the electron-detector pixel array (12);
   wherein each pixel (19) of the electron-detector pixel array (12) has:
   an electronic converter unit (20) for converting an analog measuring signal of the pixel (19) into a digital measuring signal, wherein the converter unit (20) incorporates a discriminator (27);
   an electronic post-processing unit (39) for post-processing of the digital measuring signal,
   characterized in that the converter unit (20) of each pixel (19) has:
   a signal connection to at least one clock generator (36);
   at least one counter (29, 30) that is in signal connection with the clock generator (36) and with the discriminator (27) for generating a digital timing signal; the digital timing signal being such that it results from the number of clock cycles between a time-reference point ($t_{start}$) and the moment ($t_{measurement}$) of the arrival of an analog measuring signal that is not suppressed by the discriminator (27), at the counter (29, 30).

2. A photon detector according to claim 1, characterized in that the at least one counter (29, 30) is connected to a control unit (33, 39) in such a way that the clock cycles are counted starting upon the generation of an analog measuring signal that is not suppressed.

3. A photon detector according to claim 1, characterized in that the at least one counter (29, 30) is connected to a control unit (33, 39) in such a way that the clock cycles are counted until the generation of an analog measuring signal that is not suppressed.

4. A photon detector according to claim 1, characterized in that a control unit (33, 39) cooperates with at least one counter (29, 30) in such a way that the time-reference points ($t_{start}$) are set in fixed time intervals.

5. A photon detector according to claim 1, characterized by at least one shift register (43) that cooperates with counters (29, 30) of pixels (19) of the electron-detector pixel array (12) for transmission of the digital timing signal to the post-processing unit (39) in such a way that the counter readings of the respective counter (29, 30) to be read are routed to the shift register and pushed out in rows.

6. A photon detector according to claim 1, characterized in that the post-processing unit (39) is implemented in such a way that pixels (19) associated with counter readings that have been read out, from which it can be inferred that simultaneous measuring signals were triggered at the pixels (19) associated with these counter readings, are combined.

7. A photon detector according to claim 1, characterized in that all converter units (20) and/or all post-processing units (39) are integrated in a single component.

8. A photon detector according to claim 1, characterized in that the pixels (19) are discrete entities.

9. A photon detector according to claim 1, characterized in that the pixels (19) are formed as segments of a continuous sensor layer (19*a*).

10. A photon detector according to claim 2, characterized by at least two counters (29, 30) per pixel (19), wherein the two counters (29, 30) are in signal connection with the discriminator (27) and with a counter-switching control unit (33) in such a way that exactly one counter (29, 30) is counting during a specified time period between two time-reference points ($\Delta T_{measuring\ phase}$) while the timing signals generated by the other counter (30, 29) are being read-out, i.e., routed to the post-processing unit (39)

11. A photon detector according to claim 2, characterized by at least two counters (29, 30) per pixel (19) that are in signal connection with at least one clock generator (36) in such a way that clock pulses that can be registered by the first (29, 30) of the two counters lie in time intervals between adjacent clock pulses that can be registered by the second of the two counters.

12. A photon detector according to claim 2, characterized in that the post-processing unit (39) is implemented in such a way that counter readings from which it can be inferred that no measuring signal was triggered at the pixel (19) that is associated with the counter reading are ignored.

13. A photon detector according to claim 2, characterized by an attenuation layer (18) between the photocathode (9) and the electron-detector pixel array (12) for reducing the energy of the measuring electrons.

14. A photon detector according to claim 3, characterized in that the post-processing unit (39) is implemented in such a way that counter readings from which it can be inferred that no measuring signal was triggered at the pixel (19) that is associated with the counter reading are ignored.

15. A photon detector according to claim 3, characterized by an attenuation layer (18) between the photocathode (9) and the electron-detector pixel array (12) for reducing the energy of the measuring electrons.

16. A photon detector (1)
   incorporating a photocathode (9) for the photon-induced triggering of measuring electrons;
   incorporating an at least one-dimensional electron-detector pixel array (12);
   incorporating an electron optics unit (15) for guiding the measuring electrons to the electron-detector pixel array (12);
   wherein each pixel (19) of the electron-detector pixel array (12) has:
   an electronic converter unit (20) for converting an analog measuring signal of the pixel (19) into a digital measuring signal, wherein the converter unit (20) incorporates a discriminator (27);
   an electronic post-processing unit (39) for post-processing of the digital measuring signal,
   wherein the converter unit (20) of each pixel (19) has:
   a signal connection to at least one clock generator (36);
   at least one counter (29, 30), that is in signal connection with the clock generator (36) and with the discriminator (27) for generating a digital timing signal; the digital timing signal being such that it results from the number of clock cycles between a timereference point ($t_{start}$) and the moment ($t_{measurement}$) of the arrival of an analog measuring signal that is not suppressed by the discriminator (27), at the counter (29, 30),
   the photon detector having at least two counters (29, 30) per pixel (19), wherein the two counters (29, 30) are in signal connection with the discriminator (27) and with a counter-switching control unit (33) in such a way that exactly one counter (29, 30) is counting during a specified time period between two time-reference points ($\Delta T_{measuring\ phase}$) while the timing signals generated by the other counter (30, 29) are being read-out, i.e., routed to the post-processing unit (39).

17. A photon detector (1)
incorporating a photocathode (9) for the photon-induced triggering of measuring electrons;
incorporating an at least one-dimensional electron-detector pixel array (12);
incorporating an electron optics unit (15) for guiding the measuring electrons to the electron-detector pixel array (12);
wherein each pixel (19) of the electron-detector pixel array (12) has:
an electronic converter unit (20) for converting an analog measuring signal of the pixel (19) into a digital measuring signal, wherein the converter unit (20) incorporates a discriminator (27);
an electronic post-processing unit (39) for post-processing of the digital measuring signal,
wherein the converter unit (20) of each pixel (19) has:
a signal connection to at least one clock generator (36);
at least one counter (29, 30) that is in signal connection with the clock generator (36) and with the discriminator (27) for generating a digital timing signal; the digital timing signal being such that it results from the number of clock cycles between a time-reference point ($t_{start}$) and the moment ($t_{measurement}$) of the arrival of an analog measuring signal that is not suppressed by the discriminator (27), at the counter (29, 30),
the photon detector having at least two counters (29, 30) per pixel (19) that are in signal connection with at least one clock generator (36) in such a way that clock pulses that can be registered by the first (29, 30) of the two counters lie in time intervals between adjacent clock pulses that can be registered by the second of the two counters.

18. A photon detector (1)
incorporating a photocathode (9) for the photon-induced triggering of measuring electrons;
incorporating an at least one-dimensional electron-detector pixel array (12);
incorporating an electron optics unit (15) for guiding the measuring electrons to the electron-detector pixel array (12);
wherein each pixel (19) of the electron-detector pixel array (12) has:
an electronic converter unit (20) for converting an analog measuring signal of the pixel (19) into a digital measuring signal, wherein the converter unit (20) incorporates a discriminator (27);
an electronic post-processing unit (39) for post-processing of the digital measuring signal,
wherein the converter unit (20) of each pixel (19) has:
a signal connection to at least one clock generator (36);
at least one counter (29, 30) that is in signal connection with the clock generator (36) and with the discriminator (27) for generating a digital timing signal; the digital timing signal being such that it results from the number of clock cycles between a time-reference point ($t_{start}$) and the moment ($t_{measurement}$) of the arrival of an analog measuring signal that is not suppressed by the discriminator (27), at the counter (29, 30),
the post-processing unit (39) being designed such that it registers the counter readings of all active counters (29) of the electron-detector pixel array (12) in the form of an i×j matrix.

19. A photon detector (1)
incorporating a photocathode (9) for the photon-induced triggering of measuring electrons;
incorporating an at least one-dimensional electron-detector pixel array (12);
incorporating an electron optics unit (15) for guiding the measuring electrons to the electron-detector pixel array (12);
wherein each pixel (19) of the electron-detector pixel array (12) has:
an electronic converter unit (20) for converting an analog measuring signal of the pixel (19) into a digital measuring signal, wherein the converter unit (20) incorporates a discriminator (27);
an electronic post-processing unit (39) for post-processing of the digital measuring signal,
wherein the converter unit (20) of each pixel (19) has:
a signal connection to at least one clock generator (36);
at least one counter (29, 30) that is in signal connection with the clock generator (36) and with the discriminator (27) for generating a digital timing signal; the digital timing signal being such that it results from the number of clock cycles between a time-reference point ($t_{start}$) and the moment ($t_{measurement}$) of the arrival of an analog measuring signal that is not suppressed by the discriminator (27), at the counter (29, 30),
wherein the post-processing unit (39) is implemented in such a way that counter readings from which it can be inferred that no measuring signal was triggered at the pixel (19) that is associated with the counter reading are ignored.

20. A photon detector (1)
incorporating a photocathode (9) for the photon-induced triggering of measuring electrons;
incorporating an at least one-dimensional electron-detector pixel array (12);
incorporating an electron optics unit (15) for guiding the measuring electrons to the electron-detector pixel array (12);
wherein each pixel (19) of the electron-detector pixel array (12) has:
an electronic converter unit (20) for converting an analog measuring signal of the pixel (19) into a digital measuring signal, wherein the converter unit (20) incorporates a discriminator (27);
an electronic post-processing unit (39) for post-processing of the digital measuring signal,
wherein the converter unit (20) of each pixel (19) has:
a signal connection to at least one clock generator (36);
at least one counter (29, 30) that is in signal connection with the clock generator (36) and with the discriminator (27) for generating a digital timing signal; the digital timing signal being such that it results from the number of clock cycles between a time-reference point ($t_{start}$) and the moment ($t_{measurement}$) of the arrival of an analog measuring signal that is not suppressed by the discriminator (27), at the counter (29, 30),
with a photon detector having an attenuation layer (18) between the photocathode (9) and the electron-detector pixel array (12) for reducing the energy of the measuring electrons.

* * * * *